(12) United States Patent
Wei et al.

(10) Patent No.: US 11,388,368 B2
(45) Date of Patent: Jul. 12, 2022

(54) PROCESSOR AND DISPLAY METHOD

(71) Applicant: Realtek Semiconductor Corporation, Hsinchu (TW)

(72) Inventors: Jui-Te Wei, Hsinchu (TW); Po-An Chen, Hsinchu (TW); Wei-Chih Lin, Hsinchu (TW); Yung-Chih Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/188,119

(22) Filed: Mar. 1, 2021

(65) Prior Publication Data
US 2021/0281798 A1  Sep. 9, 2021

(30) Foreign Application Priority Data

Mar. 3, 2020  (TW) .................................. 109106959

(51) Int. Cl.
*G09G 3/36* (2006.01)
*H04N 7/01* (2006.01)
(52) U.S. Cl.
CPC ......... *H04N 7/0127* (2013.01); *G09G 3/3696* (2013.01); *G09G 2340/0435* (2013.01)
(58) Field of Classification Search
CPC .................................................. H04N 7/0127
See application file for complete search history.

(56) References Cited

U.S. PATENT DOCUMENTS

| 5,280,280 A | 1/1994 | Hotto |
| 2006/0050075 A1 | 3/2006 | Gong et al. |
| 2013/0021387 A1* | 1/2013 | Takahashi ............ G09G 3/3614 |
| | | 345/204 |
| 2018/0204492 A1* | 7/2018 | Kuo ........................ G09G 3/20 |

FOREIGN PATENT DOCUMENTS

TW          200632772 A       9/2006

OTHER PUBLICATIONS

Piotr Didykl et al., "Perceptually-motivated Real-time Temporal Upsampling of 3D Content for High-refresh-rate Displays", vol. 29, No. 2, EUROGRAPHICS, 2010.
Hao Pan et al., "LCD motion blur modeling and analysis ", IEEE International Conference on Image Proceeding, 2005.

* cited by examiner

*Primary Examiner* — Gustavo Polo
(74) *Attorney, Agent, or Firm* — Locke Lord LLP; Tim Tingkang Xia, Esq.

(57) ABSTRACT

A processor is configured to be coupled to a display panel. The processor includes a first storage circuit, a converter circuit, and an overdrive circuit. The first storage circuit is configured to store input video data. The converter circuit is configured to receive the input video data, and adjust a frame rate of the input video data, to generate adjusted video data. The overdrive circuit is configured to perform an overdrive process according to the adjusted video data, to generate a driving signal, such that the display panel displays a video according to the adjusted video data and the driving signal.

17 Claims, 6 Drawing Sheets

100

PROCESSOR AND DISPLAY METHOD

RELATED APPLICATIONS

This application claims priority to Taiwanese Application Serial Number 109106959, filed Mar. 3, 2020, which is herein incorporated by reference.

BACKGROUND

Technical Field

The present disclosure relates to a circuit technology. More particularly, the present disclosure relates to a processor and a display method for a display device.

Description of Related Art

With development of technology, display devices have been applied to various fields. Compared to other display devices, a response time (RT) of a liquid crystal display device is slower. This will affect the user experience. For example, when the liquid crystal display device displays a dynamic video, the user will see a motion blur image due to the slower response time. Accordingly, the response time of the liquid crystal is an important factor for the performance of the liquid crystal display device.

SUMMARY

Some aspects of the present disclosure are to provide a processor. The processor is configured to be coupled to a display panel. The processor includes a first storage circuit, a converter circuit, and an overdrive circuit. The first storage circuit is configured to store input video data. The converter circuit is configured to receive the input video data, and adjust a frame rate of the input video data, to generate adjusted video data. The overdrive circuit is configured to perform an overdrive process according to the adjusted video data, to generate a driving signal, such that the display panel displays a video according to the adjusted video data and the driving signal.

Some aspects of the present disclosure are to provide a processor. The processor is configured to be coupled to a display panel. The display panel includes an overdrive circuit. The processor includes a first storage circuit and a converter circuit. The first storage circuit is configured to store input video data. The converter circuit is configured to receive the input video data, and adjust a frame rate of the input video data, to generate adjusted video data. The overdrive circuit is configured to perform an overdrive process according to the adjusted video data, to generate a driving signal, such that the display panel displays a video according to the adjusted video data and the driving signal.

Some aspects of the present disclosure are to provide a display method. The display method includes: receiving input video data by a first storage circuit; adjusting a frame rate of the input video data by a converter circuit, to generate adjusted video data; and performing an overdrive process according to the adjusted video data by an overdrive circuit, to generate a driving signal, such that a display panel displays a video according to the adjusted video data and the driving signal.

Based on the descriptions above, the processor and the display method of the present disclosure can speed up the response time of the display panel and avoid generating inversion ghost images.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
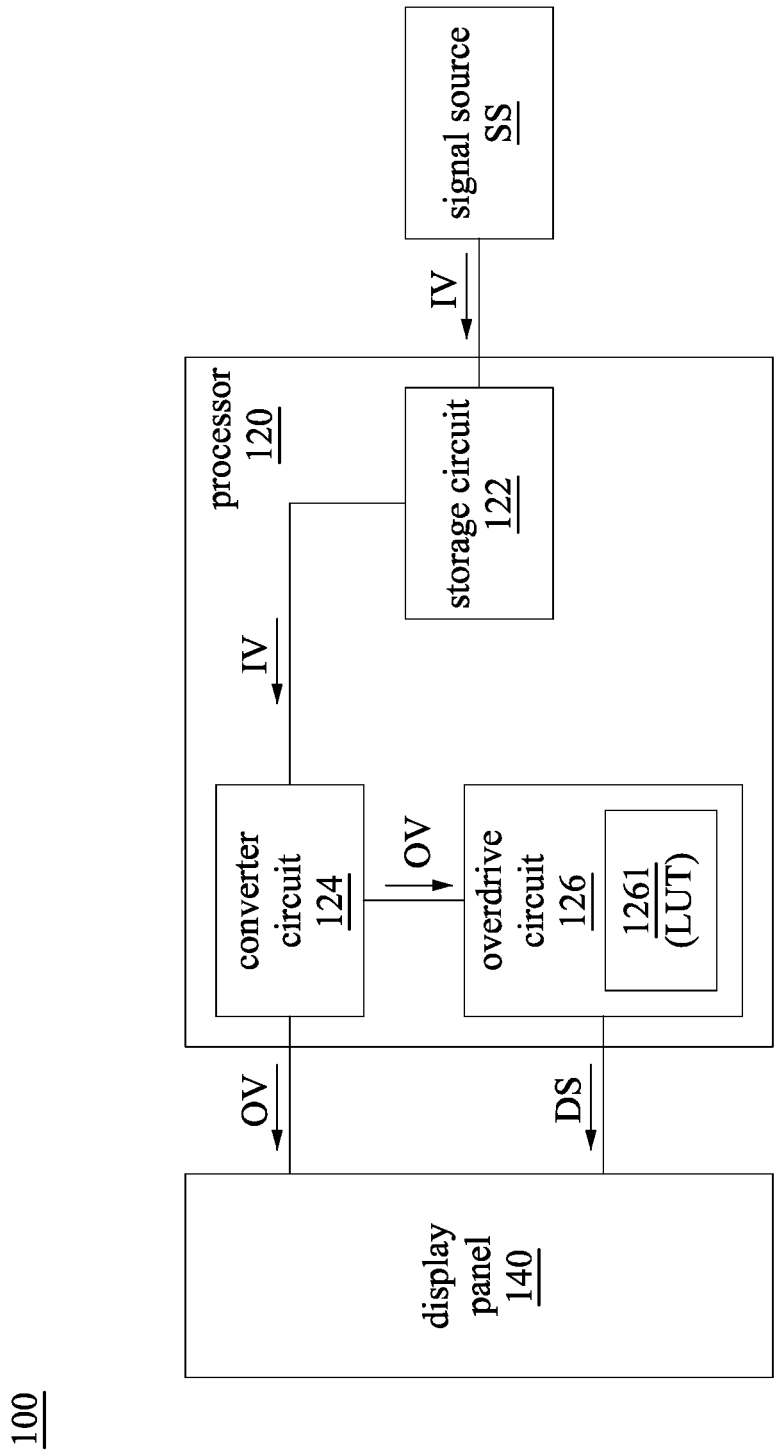
FIG. 1 is a schematic diagram illustrating a display system according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram illustrating a display system 100 according to some embodiments of the present disclosure. As illustrated in FIG. 1, the display system 100 includes a signal source SS, a processor 120, and a display panel 140. The processor 120 includes a storage circuit 122, a converter circuit 124, and an overdrive circuit 126. The overdrive circuit 126 includes a storage circuit 1261. In some embodiments, the storage circuit 1261 is implemented by a frame buffer. In some embodiments, the display panel 140 is implemented by a liquid crystal display (LCD) panel.

The signal source SS is coupled to the storage circuit 122. The storage circuit 122 is coupled to the converter circuit 124. The converter circuit 124 is coupled to the overdrive circuit 126 and the display panel 140. The overdrive circuit 126 is coupled to the display panel 140.

In operation, the signal source SS sends out input video data IV. The input video data IV includes video data which the display panel 140 can display. The input video data IV is stored in the storage circuit 122. The converter circuit 124 is configured to receive the input video data IV, and adjust a frame rate of the input video data IV, to generate adjusted video data OV. In some embodiments, the converter circuit 124 is implemented by a circuit having a frame rate conversion function. In some embodiments, the converter circuit 124 increases the frame rate of the input video data IV, to generate the adjusted video data OV. The overdrive circuit 126 performs an overdrive process according to the adjusted video data OV, to generate a driving signal DS. The display panel 140 receives the adjusted video data OV and the driving signal DS, to display a corresponding video according to the adjusted video data OV and the driving signal DS.

Figure 2:
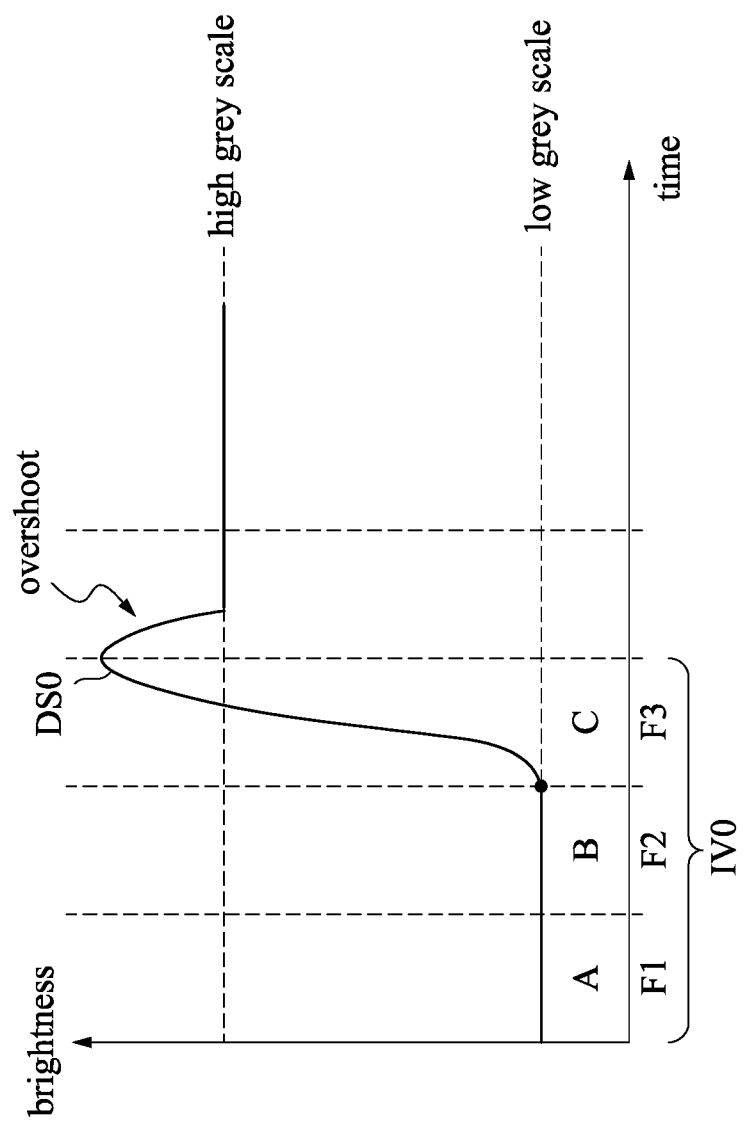
FIG. 2 is a schematic diagram illustrating unprocessed video data and an unprocessed driving signal according to some embodiments of the present disclosure.

Reference is made to FIG. 2. FIG. 2 is a schematic diagram illustrating unprocessed video data IVO and an unprocessed driving signal DSO according to some embodiments of the present disclosure. As illustrated in FIG. 2, in some related approaches, the unprocessed driving signal DSO includes at least a frame F1, a frame F2, and a frame F3. The frames F1-F3 correspond to display data A, display data B, and display data C respectively. As described above, in some embodiments, the display panel 140 is implemented by a liquid crystal display panel. Compared to other display devices, a response time (RT) of the liquid crystal display panel is slower. A time duration when the grey-scale changes from 10% to 90% is defined as the response time. The slower response time will affect the user experience. For example, when the liquid crystal display device displays a dynamic video, the user will see a motion blur image due to the slower response time. In some related approaches, an overdrive process utilizes the overdrive driving signal DSO to reduce the motion blur image. However, an overshoot will occur during the overdrive process, and inversion ghost images are generated.

Figure 3:
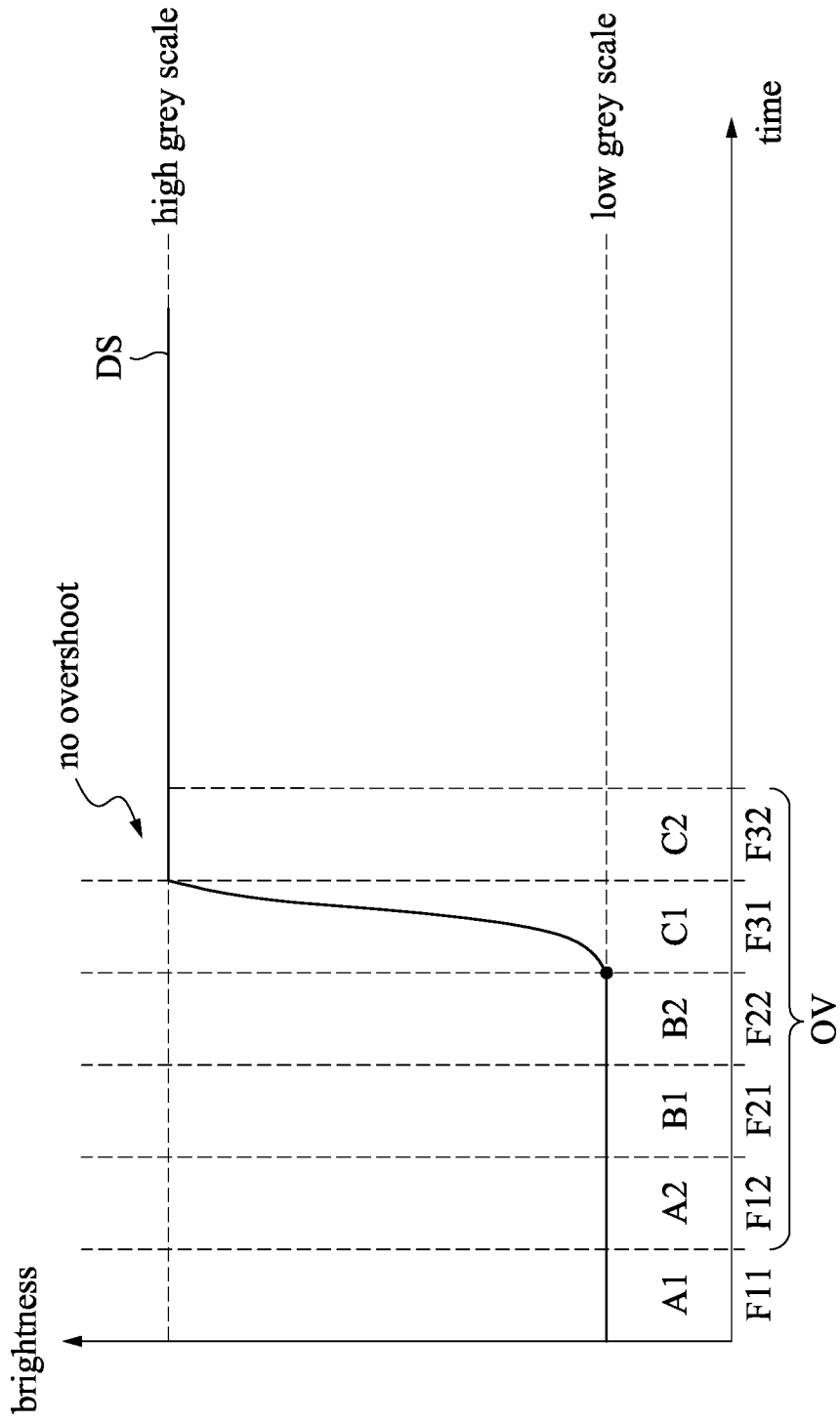
FIG. 3 is a schematic diagram illustrating processed video data and a processed driving signal according to some embodiments of the present disclosure.

Reference is made to FIG. 3. FIG. 3 is a schematic diagram illustrating processed video data (the adjusted video data OV) and a processed driving signal (the driving signal DS) according to some embodiments of the present disclosure. Compared to the related approaches above, the converter circuit 124 of the present disclosure increases the frame rate of the input video data IV. For example, if the converter circuit 124 doubles the frame rate of the input video data IV in FIG. 2 to generate the adjusted video data OV in FIG. 3, the frame rate of the adjusted video data OV in FIG. 3 is twice that of the input video data IV in FIG. 2. As illustrated in FIG. 2 and FIG. 3, a frame F1 in FIG. 2 is divided into a frame F11 and a frame F12 in FIG. 3. The display data A in FIG. 2 is displayed repeatedly to be display data A1 and display data A2, in which the display data A1 corresponds to the frame F11 and the display data A2 corresponds to the frame F12. A frame F2 in FIG. 2 is divided into a frame F21 and a frame F22 in FIG. 3, the display data B in FIG. 2 is displayed repeatedly to be display data B1 and display data B2, in which the display data B1 corresponds to the frame F21 and the display data B2 corresponds to the frame F22. A frame F3 in FIG. 2 is divided into a frame F31 and a frame F32 in FIG. 3, the display data C in FIG. 2 is displayed repeatedly to be display data C1 and display data C2, in which the display data C1 corresponds to the frame F31 and the display data C2 corresponds to the frame F32. With the adjustments above, even if the frame rate of the adjusted video data OV in FIG. 3 is higher than the frame rate of the input video data IV in FIG. 2, the display content of the adjusted video data OV in FIG. 3 is the same to the display content of the input video data IV in FIG. 2. Therefore, a user sees the same vision.

The quantities of the frames of the unprocessed video data IVO and the adjusted video data OV are for illustration, and various quantities of the frames are within the scopes of the present disclosure. For example, the quantities of the frames of the input video data IV is three or more than three, and the converter circuit 124 increases the frame rate of the input video data IV by twice or more than twice, to generate the adjusted video data OV. For example, the converter circuit 124 increases the frame rate of the input video data IV by more than three times or four times, to generate the adjusted video data OV.

In addition, the overdrive circuit 126 outputs the driving signal DS according to the adjusted video data OV. As illustrated in FIG. 3, if the display data B2 of the frame F22 (for example, a dark image with a lower grey-scale) is different from the display data C1 (for example, a bright image with a higher grey-scale) of the frame F31, the overdrive circuit 126 performs the overdrive process on the driving signal DS according to the frame F31. For example, the overdrive process may be performed at a start timing point of the frame F31.

In some embodiments, the overdrive circuit 126 determines an overdrive voltage according to a look-up table LUT in the storage circuit 1261, to perform the overdrive process based on the determined overdrive voltage. For example, if the grey-scale of the display data B2 of the frame F2 is 0 and the grey-scale of the display data C1 of the frame 31 is 128, a corresponding grey-scale 160 (larger than 128) is determined according to the look-up table LUT, to output the corresponding overdrive voltage. Compared to increasing the grey-scale (brightness) of the display panel 140 from 0 to 128, the increasing degree of the driving signal DS is faster by increasing the grey-scale (brightness) of the display panel 140 from 0 to 160 (overdrive process).

Utilizing the overdrive process during the images conversion can speed up the grey-scale response time of the liquid crystal. In addition, since the overdrive process can be merely maintained a frame, the overdrive process is stopped at the end timing point of the frame F31. Accordingly, a frame length in FIG. 3 is shorten, and thus it can effectively prevent the driving signal DS having an overshoot.

The overdrive process illustrated above is performed for display data changing from a lower grey-scale to a higher grey-scale, but the present disclosure is not limited thereto. The overdrive process can also be performed for display data changing from a higher grey-scale to a lower grey-scale, so as to speed up the grey-scale response of the liquid crystal.

After the adjusted video data OV and the driving signal DS are determined, the display panel 140 displays a corresponding video according to the adjusted video data OV and the driving signal DS. As the descriptions above, the display panel 140 may be a liquid crystal display panel. Accordingly, the adjusted video data OV can be configured to control the frame rate of the display panel 140, and the driving signal DS can be configured to control the rotation degree of the liquid crystal in the display panel 140, to control the transmittance of the liquid crystal. Thus, a backlight module of the display panel 140 can work with coordination with the rotated liquid crystal, to achieve the display function.

Figure 4:
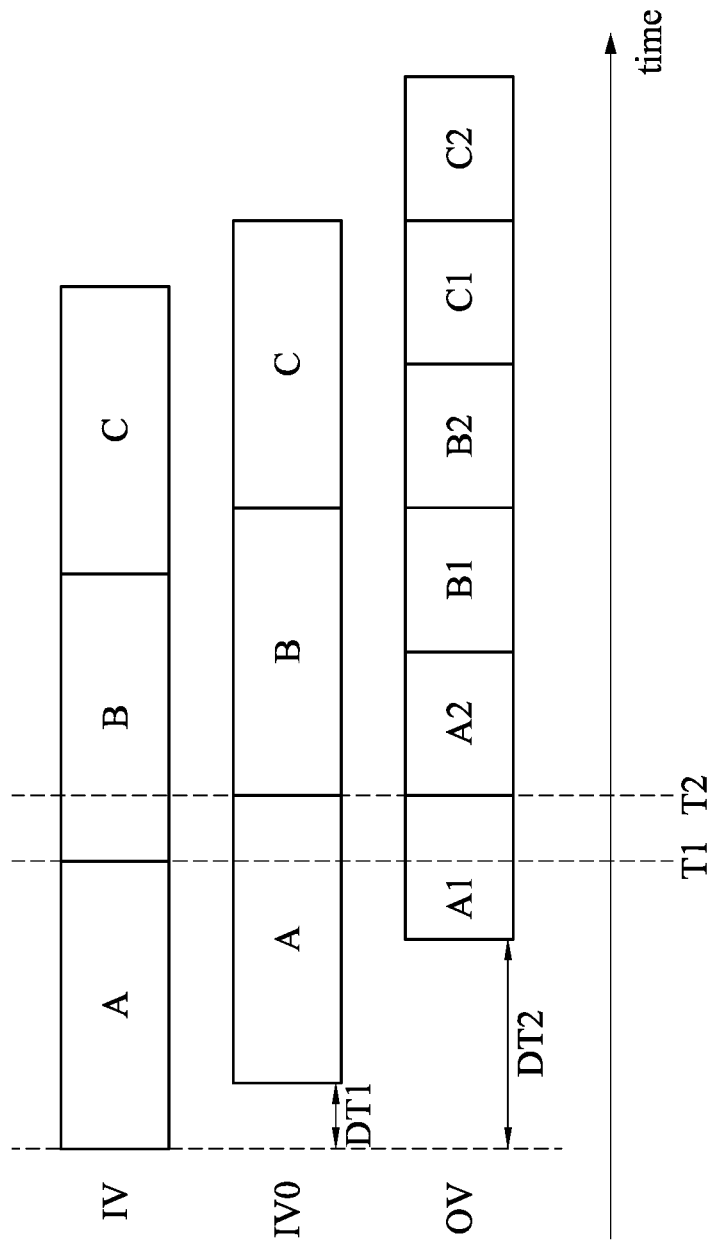
FIG. 4 is a waveform diagram illustrating input video data, unprocessed output video data, and an adjusted video data according to some embodiments of the present disclosure.

FIG. 4 is a waveform diagram illustrating the input video data IV, the unprocessed output video data IVO, and the adjusted video data OV according to some embodiments of the present disclosure.

As illustrated in FIG. 2 and FIG. 4, the input video data IV inputted into the processor 120 includes display data A, display data B, and display data C. If the frame rate of the input video data IV is not increased, the video data IVO inputted into the display panel 140 also includes the display data A, the display data B, and the display data C. Base on delay of the electrical elements, there is a delay time duration DT1 between the video data IVO inputted into the display panel 140 and the input video data IV inputted into the processor 120. As illustrated in FIG. 3 and FIG. 4, the adjusted video data OV with the higher frame rate includes the display data A1, the display data A2, the display data B1, the display data B2, the display data C1, and the display data C2. As described above, the display data of the adjusted video data OV processed by the converter circuit 124 is the same to the display data of the input video data IV. Accordingly, a user sees the same vision. However, there is a delay time duration DT2 between the adjusted video data OV and the input video data IV. The delay time duration DT2 (for example, 6-7 milliseconds) is substantially slightly greater than the delay time duration DT1 (for example, 2 milliseconds). Since the delay time duration DT2 is slightly larger than the delay time duration DT1, this does not affect the vision experience of the user.

In general an end timing point of display data of the adjusted video data OV is after an end timing point of a display data of the input video data IV. For example, an end timing point T2 of display data A1 of the adjusted video data OV is after an end timing point T1 of a display data A of the input video data IV. This can ensure that the display data A1 is displayed correctly and completely after the display data A is received completely.

Figure 5:
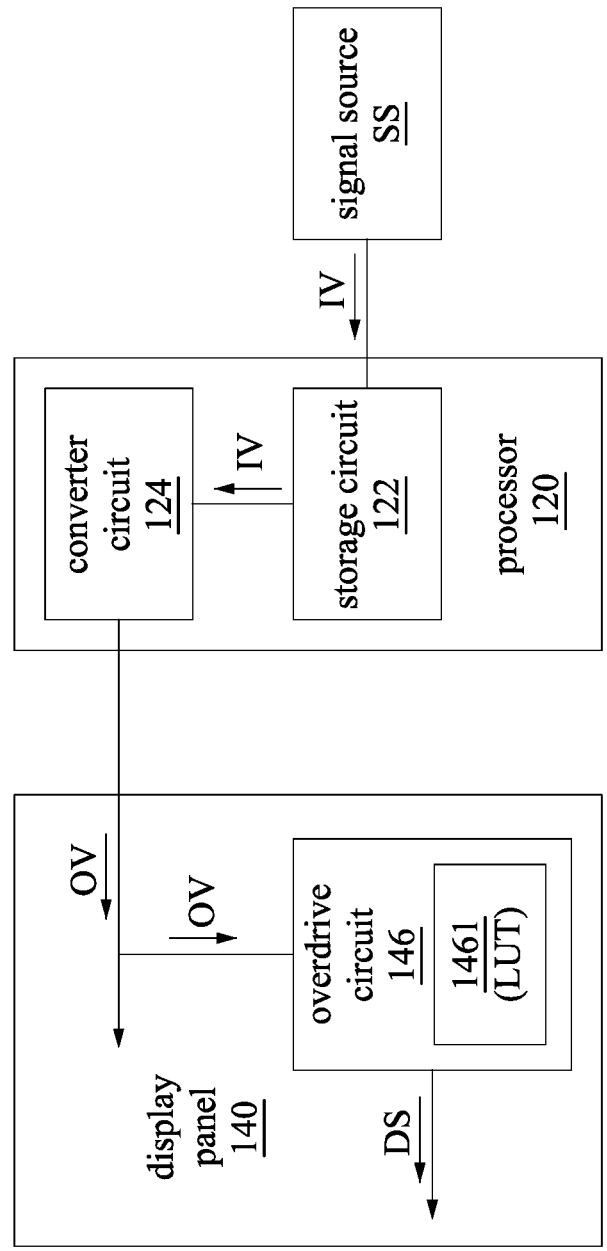
FIG. 5 is a schematic diagram illustrating a display system according to some embodiments of the present disclosure.

Reference is made to FIG. 5. FIG. 5 is a schematic diagram illustrating a display system 500 according to some embodiments of the present disclosure. A main difference between the display system 500 in FIG. 5 and the display system 100 in FIG. 1 is that an overdrive circuit 146 in the display system 500 is disposed in the display panel 140. Operations of the overdrive circuit 146 in FIG. 5 are similar to the overdrive circuit 126 in FIG. 1. For example, the overdrive circuit 146 in FIG. 5 includes a storage circuit 1461, and the look-up table LUT is stored in the storage circuit 1461. Other elements and operations of the display system 500 in FIG. 5 are similar to other elements and operations of the display system 100 in FIG. 1, so they are not described herein again.

Figure 6:
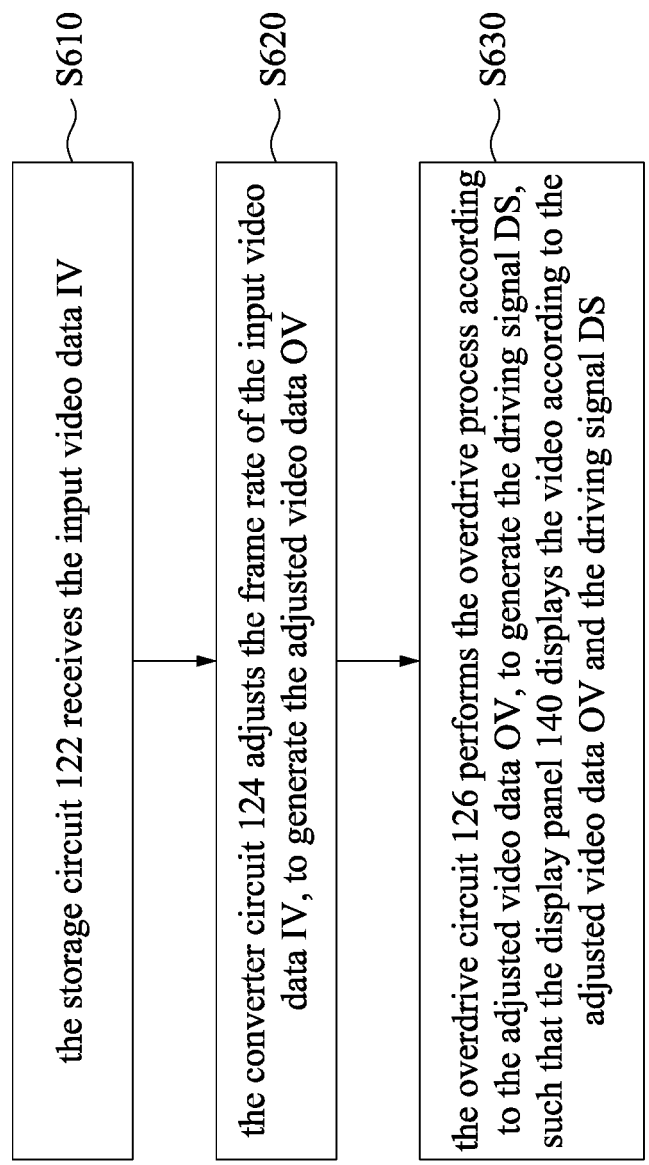
FIG. 6 is a flow diagram illustrating operations of a display method according to some embodiments of the present disclosure.

Reference is made to FIG. 6. FIG. 6 is a flow diagram illustrating operations of a display method 600 according to some embodiments of the present disclosure. The display method 600 includes operations S610, S620, and S630.

In some embodiments, the display method 600 is applied to the display system 100 in FIG. 1 or the display system 500 in FIG. 5, but the present disclosure is not limited thereto. For ease of understanding, the display method 600 is discussed with the display system 100 in FIG. 1 or the display system 500 in FIG. 5.

In operation S610, the storage circuit 122 receives the input video data IV. In some embodiments, the input video data IV is form the signal source SS.

In operation S620, the converter circuit 124 adjusts the frame rate of the input video data IV, to generate the adjusted video data OV. In some embodiments, the frame rate of the adjusted video data OV is twice or more than twice that of the input video data IV.

In operation S630, the overdrive circuit 126 or the overdrive circuit 146 performs the overdrive process according to the adjusted video data OV, to generate the driving signal DS. Accordingly, the display panel 140 can display the video according to the adjusted video data OV and the driving signal DS. In some embodiments, the overdrive circuit 126 is disposed in the processor 120. In some other embodiments, the overdrive circuit 146 is disposed in the display panel 140.

In some embodiments, the display method 600 can be applied to video with lower frame rate. In some related approaches, when the frame rate of the video data is lower, there are serious inversion ghost images if the overdrive voltage is too larger. With the display method 600, not only the grey-scale response time of the liquid crystal is speeded up but also it can effectively prevent the overshoot from occurring to prevent generating the inversion ghost images when the frame rate of the video is lower.

The above description of the display method 600 includes exemplary operations, but the operations of the display method 600 are not necessarily performed in the order described. The order of the operations of the display method 600 disclosed in the present disclosure are able to be changed, or the operations are able to be executed simultaneously or partially simultaneously as appropriate, in accordance with the spirit and scope of various embodiments of the present disclosure.

Based on the descriptions above, the processor and the display method of the present disclosure can speed up the response time of the display panel and avoid generating inversion ghost images.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A processor configured to be coupled to a display panel, wherein the processor comprises:
    a first storage circuit configured to store input video data;
    a converter circuit configured to receive the input video data, and adjust a frame rate of the input video data, to generate adjusted video data; and
    an overdrive circuit configured to perform an overdrive process according to the adjusted video data, to generate a driving signal, such that the display panel displays a video according to the adjusted video data and the driving signal,
    wherein when the frame rate is doubled, a first frame of the input video data corresponds to a second frame and a third frame of the adjusted video data.

2. The processor of claim 1, wherein the converter circuit is further configured to increase the frame rate of the input video data.

3. The processor of claim 2, wherein the converter circuit is further configured to double the frame rate of the input video data at least two times.

4. The processor of claim 1, wherein if the third frame of the adjusted video data of is different from the second frame of the adjusted video data, the overdrive process is performed corresponding to the third frame.

5. The processor of claim 4, wherein the overdrive circuit comprises:
   a second storage circuit configured to store a look-up table, wherein the overdrive circuit is further configured to determine an overdrive voltage according to the look-up table, to perform the overdrive process according to the overdrive voltage.

6. The processor of claim 1, wherein the display panel is a liquid crystal display panel.

7. A processor configured to be coupled to a display panel, wherein the display panel comprises an overdrive circuit, wherein the processor comprises:
   a first storage circuit configured to store input video data; and
   a converter circuit configured to receive the input video data, and adjust a frame rate of the input video data, to generate adjusted video data,
   wherein the overdrive circuit is configured to perform an overdrive process according to the adjusted video data, to generate a driving signal, such that the display panel displays a video according to the adjusted video data and the driving signal,
   wherein when the frame rate is doubled, a first frame of the input video data corresponds to a second frame and a third frame of the adjusted video data.

8. The processor of claim 7, wherein the converter circuit is further configured to increase the frame rate of the input video data.

9. The processor of claim 8, wherein the converter circuit is further configured to increase the frame rate of the input video data by at least twice.

10. The processor of claim 7, wherein if the third frame of the adjusted video data of is different from the second frame of the adjusted video data, the overdrive process is performed corresponding to the third frame.

11. The processor of claim 10, wherein the overdrive circuit comprises:
   a second storage circuit configured to store a look-up table, wherein the overdrive circuit is further configured to determine an overdrive voltage according to the look-up table, to perform the overdrive process according to the overdrive voltage.

12. The processor of claim 7, wherein the display panel is a liquid crystal display panel.

13. A display method comprising:
   receiving input video data by a first storage circuit;
   adjusting a frame rate of the input video data by a converter circuit, to generate adjusted video data; and
   performing an overdrive process according to the adjusted video data by an overdrive circuit, to generate a driving signal, such that a display panel displays a video according to the adjusted video data and the driving signal,
   wherein when the frame rate is increased doubled, a first frame of the input video data corresponds to a second frame and a third frame of the adjusted video data.

14. The display method of claim 13, wherein adjusting the frame rate of the input video data by the converter circuit comprises:
   increasing the frame rate of the input video data by the converter circuit.

15. The display method of claim 14, wherein the converter circuit is further configured to double the frame rate of the input video data.

16. The display method of claim 13, wherein if the third frame of the adjusted video data of is different from the second frame of the adjusted video data, the overdrive process is performed corresponding to the third frame.

17. The display method of claim 16, wherein performing the overdrive process comprises:
   determining an overdrive voltage according to a look-up table stored in a second storage circuit of the overdrive circuit by the overdrive circuit, to perform the overdrive process according to the overdrive voltage.

* * * * *